Feb. 26, 1957 H. H. HOPKINS 2,782,684
VARIABLE MAGNIFICATION OPTICAL SYSTEMS
Filed Oct. 5, 1954 2 Sheets-Sheet 1
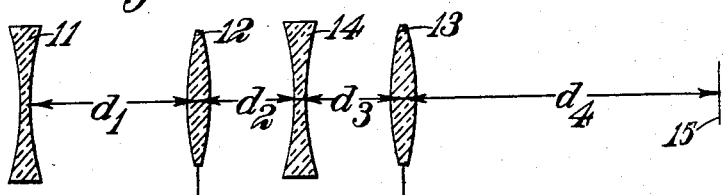
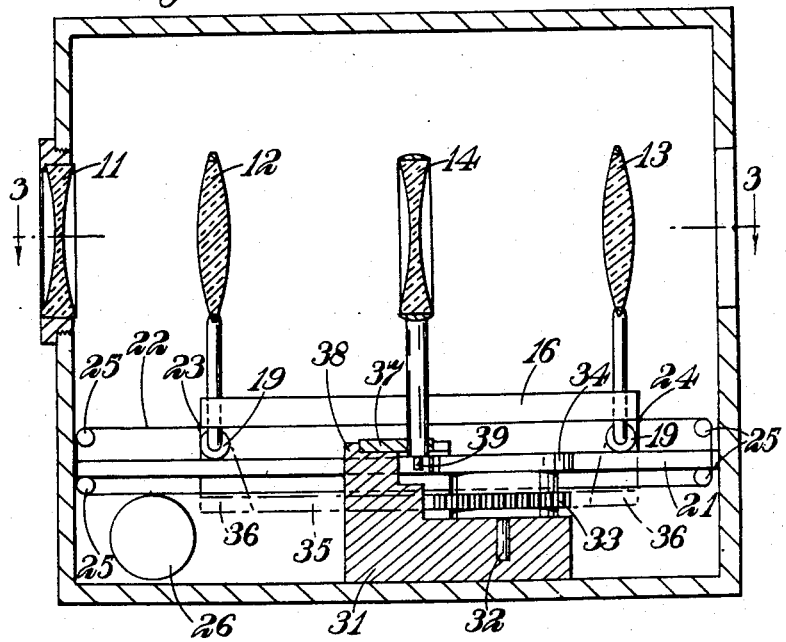
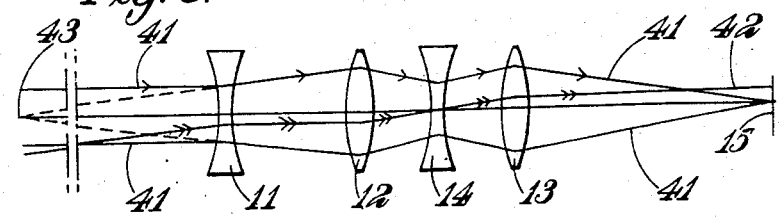
INVENTOR
Harold H. Hopkins
By Watson, Cole, Grindle & Watson
ATTORNEYS Feb. 26, 1957    H. H. HOPKINS    2,782,684
VARIABLE MAGNIFICATION OPTICAL SYSTEMS
Filed Oct. 5, 1954    2 Sheets-Sheet 2

INVENTOR
Harold H. Hopkins
By Watson, Cole, Grindle &
Watson    ATTORNEYS

United States Patent Office 2,782,684
Patented Feb. 26, 1957

2,782,684

VARIABLE MAGNIFICATION OPTICAL SYSTEMS

Harold Horace Hopkins, London, England, assignor to W. Watson & Sons Limited, London, England, a British company Application October 5, 1954, Serial No. 460,361

Claims priority, application Great Britain October 9, 1953

13 Claims. (Cl. 88—57)

The invention relates to variable magnification optical systems of the kind (hereinafter referred to as the kind described) which may be used alone or in conjunction with a further optical system (e. g. the lens system of a camera) to produce an image of continuously variable size of an object at a fixed distance from the system. Such a system may be used for example in or with a stationary cine camera or television transmitting camera in order continuously to increase or decrease the size of the image, on the film or other image receiving device, of objects in the scene towards which the camera is directed and thereby to give the impression when the film is projected, or the television receiver is viewed, that the view-point approaches or recedes from objects in the scene.

Examples of variable magnification optical systems of the kind described are described and claimed in United States Patents Nos. 2,501,219, 2,566,889, 2,537,561 and 2,514,239 and United States patent applications Serial Nos. 236,482, now Patent No. 2,663,223 dated December 22, 1953, and 308,825, now Patent No. 2,741,155 dated April 15, 1956.

It is an object of the invention to provide an improved variable magnification optical system of the kind described.

The invention provides a variable magnification optical system comprising two positive (convergent) lenses and a negative (divergent) lens, all arranged on a common optical axis with the two positive lenses spaced apart, and the negative lens between the two positive lenses and spaced from at least one of them, the lenses being movable axially and the positive lenses being constrained to maintain a constant axial distance between them during their axial movement, and, in combination with the lenses, magnification varying means for continuously and simultaneously moving the two positive lenses and the negative lens along the optical axis relative to a stationary base or like support according to a law such that the distance from a fixed point on the base at which the image of an object at a fixed distance from the said fixed point on the base is accurately focussed remains constant while the size of the said image is continuously varied during the operation of the magnification varying means, the distance between the image position for the rear one of the said positive lenses and the corresponding conjugate object position for the other of the said positive lenses being finite and not greater numerically than a small multiple of (e. g. 10 times, or more preferably 7 times) the focal length of either of the said movable lenses. This last mentioned condition ensures that the object distance for the front movable positive lens and the image distance for the rear movable positive lens are both finite, and consequently the individual magnifications produced by each of the said positive lenses change as the positions of these lenses are changed by the operation of the magnification varying means.

It will be appreciated that when the system includes one or more lenses interposed between the rear one of the said positive lenses and the final image position for the system, the said image position for that rear one of the said positive lenses will be the position of the intermediate real or virtual image formed by that rear positive lens, otherwise it will be the position of the final image for the system. Similarly, when the system includes one or more lenses interposed between the other (front) one of the said positive lenses and the actual object position the said conjugate object position for the front one of the said positive lenses will be the intermediate real or virtual image which acts as the effective object for that front positive lens, otherwise it will be the actual object position for the system.

Furthermore the system is preferably designed and used so that the magnifications of the two movable positive lenses are of like sign, preferably such that each movable positive lens produces an inverted image of the effective object for that lens. This preferred condition is satisfied if the object distance for the front movable positive lens is negative in sign and numerically greater than the focal length of the said front movable positive lens, and the image distance for the rear movable positive lens is positive in sign and numerically greater than the focal length of the said rear positive movable lens, an object or image distance being regarded herein as negative or positive according as the said object or image is in front of or at the rear of the lens to which it refers. When the magnifications of the two movable positive lenses are so arranged to be of like sign in any given position of the said movable positive lenses, the said magnifications change in such a manner, when the lenses are displaced as described above, that they both increase together or decrease together in numerical value (according as the said displacement of the movable positive lenses is in one direction or the other), and hence both act in the same sense so far as their effect in increasing or decreasing the size of the fixed final image is concerned. When the movable positive lenses are displaced relative to the base, by the operation of the magnification varying means, the movable negative lens is simultaneously displaced by the said magnification varying means by an amount such that the distance from an object in a fixed position relative to the base to the image of that object produced by the action of the two movable positive lenses and the movable negative lens taken together remains constant. There will be, in general, two positions of the movable negative lens for which this condition is satisfied and to distinguish between these two positions the movement of the movable negative lens relative to that of the movable positive lenses is preferably arranged such that the magnification of the movable negative lens increases or decreases numerically according as the magnifications of the movable positive lenses increase or decrease in numerical value. The individual magnifications of all the three movable lenses then simultaneously and continuously increase or decrease in numerical value as the positions of the said three movable lenses are simultaneously and continuously varied by the operation of the magnification varying means, and this constitutes a valuable preferred feature of the invention.

The ranges of movement of the lenses are preferably such that the maximum and minimum magnifications of the system are reciprocals one of the other. This is advantageous in correcting the aberrations of the system. The two movable positive lenses preferably have equal focal lengths and the movements of the three movable lenses are preferably such that during their range of movements the position of the negative lens relative to the two positive lenses changes from near one of the positive lenses (to give one limit value of magnification) to near the other of the positive lenses (to give another limit value of magnification, which limit value is the reciprocal of the other limit value). The focal lengths of the lenses of the system are preferably such as to give approximately equal amounts of positive and negative power in the system.

The maximum distance through which it is necessary for the negative lens to be moved has been found to depend upon the value of the said constant axial distance between the two positive lenses. It has been found that the necessary displacement of the negative lens, relative to a fixed point on the base, is in one sense for small values of the constant axial distance between the two positive lenses and is in the opposite sense for suitable larger values of that constant distance. To simplify the mechanical design of the magnification varying means the value of the constant axial distance between the two positive lenses may be chosen so that the distance through which the negative lens has to be moved is at a minimum or at least is small. To satisfy other conditions, however, (e. g. correction of aberrations) it may be desirable to employ a different constant axial distance between the positive lenses and consequently to move the negative lens through a larger distance. It has been found that an increase in the value of the constant axial distance between the two positive lenses results in it being necessary to move those lenses through a smaller distance relative to the base to achieve any given range of magnification, and that, alternatively, movement of the positive lenses through the same distance provides a greater range of magnification.

In conjunction with any given focal length for the negative lens, the positive lenses may have any of a range of focal lengths. An increase in the value of the focal lengths of the positive lenses enables a greater range of magnification to be achieved.

In the system of the present invention the individual magnifications of all of the three movable lenses change in one and the same direction when the magnification varying means are operated to change the magnification of the complete system. Consequently the three lenses all contribute in the same sense the desired change in magnification.

The invention enables very large variations of magnification to be obtained without the overall length of the system being excessive.

The system may include two fixed or stationary lenses positioned on the optical axis, respectively optically before and after the three movable lenses. The stationary lenses may be both of the same sign and are preferably both positive lenses. They are preferably of equal focal length and symmetrically positioned about the mid-position of the three movable lenses. The inclusion of such a pair of fixed positive lenses increases the overall length of the system but facilitates the correction of aberrations. The effect of the fixed lenses is to increase the angle of rays of the axial pencil, thereby affording the possibility of an increased relative aperture (lower F number) with the same linear lens diameters. In this case by arranging that the power of the rear fixed positive lens is greater than that of the front fixed positive lens the equivalent focal length of the system is reduced by a factor which is greater than the reduction of the overall length and, in consequence, as stated above the advantage of great reduction of overall length is lost. It remains, however, that when a large range of magnification is contemplated that advantage is obtainable and this is of considerable advantage to the designer.

The ranges of movement of the movable lenses are preferably such that at one, or each, limit of their movements the movable negative lens lies very close to one of the movable positive lens, the criterion of closeness being that the principal planes of the movable negative lens and the adjacent movable positive lens shall have a separation which is very small in comparison with their focal lengths. A fixed or normally stationary lens, preferably a negative lens, may be positioned optically in front of the movable lenses and may be adjustable along the axis to focus the system for objects at various distances from the base. The normally stationary negative lens may be of such focal length that when it is focused for an infinite object distance the position of the normally stationary negative lens is such that it just permits the full range of movement of the movable positive lenses, with a clearance determined only by practical considerations. A diaphragm stop for the system may be placed in contact with the movable negative lens and when the whole system is working in its wide angle position the separation between the normally stationary negative lens and the front one of the movable positive lenses may be of the order of the focal length of the normally stationary negative lens. If the movable negative lens is in contact with the positive lens nearest to the normally stationary negative lens, then the stop position so determined constitutes the exit pupil for the normally stationary negative lens and, in consequence, the distance of the entrance pupil for this lens will be at a distance rearwardly of it of the order of half its focal length, and this means that the incidence heights for the principal rays are small for a lens of this kind and hence permit the use of a large angle field. This is of importance in correcting the aberrations.

A specific example of a system embodying the invention will now be described by way of example and with reference to the accompanying drawings, in which:

Figure 1 is a diagrammatic longitudinal section showing the optical arrangement of the system;

Figure 2 is a longitudinal sectional view of the system, taken on the line 2—2 of Figure 3;

Figure 5 shows ray paths through the system, and Figure 6 shows a modified system including two positive lenses respectively optically before and after the three movable lenses.

Figure 3:
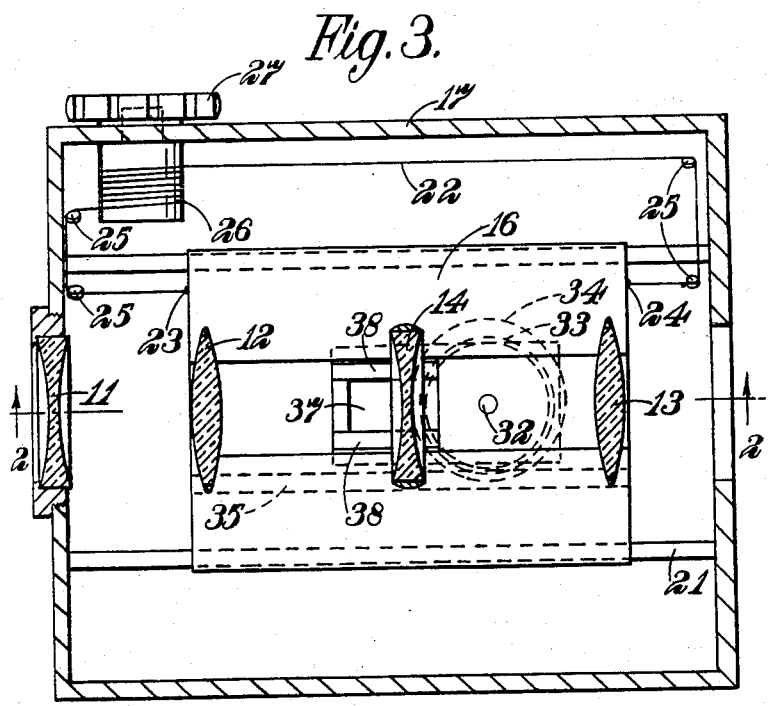
Figure 3 is a sectional view taken on the line 3—3 of Figure 2.

In this example the system comprises a normally stationary negative lens 11, two movable positive lenses 12, 13 and a movable negative lens 14. An image receiver, e. g. a film, is placed at 15. The movable positive lenses 12, 13 are rigidly mounted on a carriage 16, which maintains then at a constant axial distance apart.

The lenses are housed in a casing 17 having a base 18. The carriage 16 has wheels 19 which run on rails 21 secured to the casing 17, and the carriage is propelled along the rails by a taut driving wire 22 which has its ends attached to the carriage at 23, 24. The wire 22 passes over guide pulleys 25 and is wound several times around a drum 26. The drum may be rotated in either direction by a control knob 27, thereby to drive the carriage along the rails and so move axially the two positive lenses 12, 13.

A block 31 secured rigidly to the base 18 provides a stationary bearing for a vertical shaft 32 carrying for rotation together with it a gear wheel 33 and a cam 34. The gear wheel 33 meshes with a rack 35 carried by the carriage 16 and rigidly suspended beneath it by brackets 36. Thus, as the carriage moves along the rails the engagement between the gear wheel 33 and the rack 35 causes the cam 34 to rotate, its angular position at any instant being determined by the position of the carriage along the length of the rails.

The movable negative lens 14 is carried by a slide 37 which is guided for movement parallel to the axial direction of the lenses by suitable shaped parts 38 formed at the upper end of the block 31. The slide 37 has a downwardly projecting pin 39 which engages with the periphery of the cam 34, the slide 37 being urged by a spring (not shown) to maintain the pin 39 in contact with the cam. As the cam rotates the slide 37, and consequently the negative lens 14, are moved axially in accordance with the required law. Thus manual rotation of the control knob 27 moves the three lenses 12, 13, 14 in the required manner.

The law of movement of the movable lenses in this example is as indicated in the following table which shows the variation in the axial distances $d_1$, $d_2$, $d_3$ and $d_4$:

| F | $d_1$ | $d_2$ | $d_3$ | $d_4$ | $d_1+d_2$ |
|---|---|---|---|---|---|
| 64.746 | 0.3132 | 8.0 | 0.0 | 17.352 | 8.3132 |
| 53.229 | 0.6528 | 7.5 | 0.5 | 17.014 | 8.1528 |
| 43.122 | 1.0363 | 7.0 | 1.0 | 16.631 | 8.0363 |
| 34.395 | 1.4684 | 6.5 | 1.5 | 16.198 | 7.9684 |
| 27.000 | 1.9524 | 6.0 | 2.0 | 15.715 | 7.9524 |
| 20.868 | 2.4883 | 5.5 | 2.5 | 15.178 | 7.9883 |
| 15.9087 | 3.072 | 5.0 | 3.0 | 14.595 | 8.072 |
| 12.0000 | 3.692 | 4.5 | 3.5 | 13.974 | 8.192 |
| 9.0000 | 4.333 | 4.0 | 4.0 | 13.333 | 8.333 |
| 6.7500 | 4.974 | 3.5 | 4.5 | 12.692 | 8.474 |
| 5.0916 | 5.595 | 3.0 | 5.0 | 12.072 | 8.595 |
| 3.8815 | 6.178 | 2.5 | 5.5 | 11.4883 | 8.678 |
| 3.0000 | 6.715 | 2.0 | 6.0 | 10.9524 | 8.715 |
| 2.3549 | 7.198 | 1.5 | 6.5 | 10.4684 | 8.698 |
| 1.87839 | 7.631 | 1.0 | 7.0 | 10.0363 | 8.631 |
| 1.52172 | 8.014 | 0.5 | 7.5 | 9.6528 | 8.514 |
| 1.25100 | 8.352 | 0.0 | 8.0 | 9.3132 | 8.352 |

The lenses have the following focal lengths ($f$):

| Lens | Focal Length |
|---|---|
| 11 | $f_{11}=-9$ |
| 12 | $f_{12}=+5$ |
| 13 | $f_{13}=+5$ |
| 14 | $f_{14}=-2$ |

The above dimensions are expressed in inches.

The first table given above includes the value of the focal length (F) of the system, expressed in inches, for each of the listed positions in the movements of movable lenses. It will be seen that the ratio of the maximum to the minimum focal length (and consequently the ratio of the maximum to the minimum magnification) is about 50:1. The overall length of the system is only of the order of one third of the maximum focal length thereof.

Figure 4:
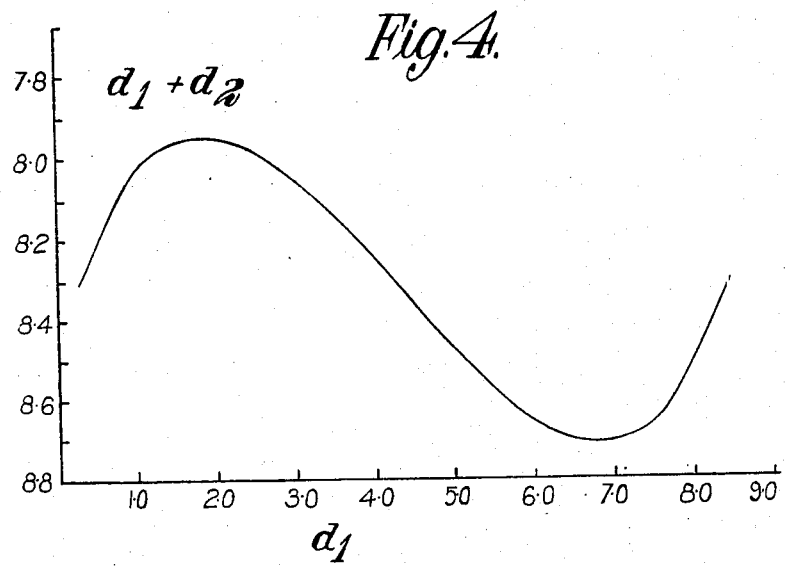
Figure 4 is a graph showing the movement of the movable negative lens relative to the base.

It may be seen from the above table that in this example the movement of the movable negative lens relative to a fixed point on the base, which movement is determined by the variation in the numerical sum of the distances $d_1$ and $d_2$ is small. The variation of the sum ($d_1+d_2$) with the distance $d_1$ is shown in the above first table and is also shown graphically in Figure 4. That data defines the shape of the cam 34.

Figure 5 shows the paths of rays 41 which reach the system, parallel to the axis, from the object which in this example is at infinity i. e. a very large distance away, and a ray 42 from the object, which ray reaches the system at an angle of about 5 degrees to the axis.

The lens 11 forms a virtual image at its focus 43 and that virtual image serves as the effective object for the front positive lens 12. The axial distance between the point 43 and the image receiver 15 is 34.67 inches, i. e. just under seven times the focal length of each of the positive lenses 12, 13.

The lenses are shown merely diagrammatically in the drawings and the distances given in the above first table are calculated from the simplified theory of thin lenses. The lenses are each individually corrected for chromatic aberrations and each of them may comprise two or more component lenses cemented together or spaced apart by a fixed distance or having a combination of cementing and fixed spacing.

The field curvature may be readily made small as the absolute powers of the lenses have an algebraic sum which is small. As the changes in magnification of the complete system are contributed to substantially equally by the three movable lenses respectively the correction of the other aberrations is facilitated.

The system of this example may be employed in conjunction with a television transmitting camera, a cine camera or the like but it may alternatively be employed, for example, as a variable focal length projection lens for a film projector.

The invention is not restricted to the details of the foregoing example. For instance the three movable lenses may be employed alone, or with a pair of stationary positive or negative lenses optically before and after them, to provide a symmetrical system of variable power working about a mean magnification of minus 1, which system is suitable for lenses of the kind known as process lenses.

I claim:

1. A variable magnification optical system comprising two positive (convergent) lenses and a negative (divergent) lens, all arranged on a common optical axis with the two positive lenses spaced apart, and the negative lens between the two positive lenses and spaced from at least one of them, the said lenses all being movable axially and the positive lenses being constrained to maintain a constant axial distance between them during their axial movement, and, in combination with the lenses, magnification varying means for continuously and simultaneously moving the two positive lenses and the negative lens along the optical axis relative to a stationary support according to a law such that the distance from a fixed point on the support at which the image of an object at a fixed distance from the said fixed point on the support is accurately focussed remains constant while the size of the said image is continuously varied during the operation of the magnification varying means, the distance between the image position for the rear one of the said positive lenses and the corresponding conjugate object position for the other of the said positive lenses being finite and not greater numerically than a small multiple of the focal length of one of the said positive lenses.

2. A variable magnification optical system as claimed in claim 1, in which the object distance for the front one of the said positive lenses is negative in sign and numerically greater than the focal length of that front positive lens, and the image distance for the rear one of the said positive lenses is positive in sign and numerically greater than the focal length of that rear positive lens.

3. A variable magnification optical system as claimed in claim 2, in which the movement of said negative lens relative to that of the said positive lenses is such that the magnification of the said negative lens increases and decreases numerically according as the magnifications of the said positive lenses increase and decrease in numerical value.

4. A variable magnification optical system as claimed in claim 3, in which the ranges of movement of the said three lenses are such that the maximum and minimum magnification of the system are reciprocals one of the other.

5. A variable magnification optical system as claimed in claim 4, in which the said two positive lenses have equal focal lengths.

6. A variable magnification optical system as claimed in claim 5 in which the movements of the said three lenses are such that during their range of movements the position of the negative lens relative to the two positive lenses changes from near one of the positive lenses, at one limit value of magnification, to near the other of the positive lenses, at another limit value of magnification, which limit value is the reciprocal of the other limit.

7. A variable magnification optical system as claimed in claim 6, in which the ranges of movement of the movable lenses are such that at one, or each limit of their movements the said negative lens lies very close to one of the said positive lenses, the criterion of closeness being that the principal planes of the said negative lens and the adjacent positive lens have a separation which is very small in comparison with their focal lengths.

8. A variable magnification optical system comprising two positive lenses and a negative lens, all arranged on a common optical axis with the two positive lenses spaced apart, and the negative lens between the two positive lenses and spaced from at least one of them, the said lenses all being movable axially and the positive lenses being constrained to maintain a constant axial distance between them during their axial movement, magnification varying means, in combination with said lenses, for continuously and simultaneously moving the two positive lenses and the negative lens along the optical axis relative to a stationary support according to a law such that the distance from a fixed point on the support at which the image of an object at a fixed distance from the said fixed point on the support is accurately focussed remains constant while the size of the said image is continuously varied during the operation of the magnification varying means, the distance between the image position for the rear one of the said positive lenses and the corresponding conjugate object position for the other of the said positive lenses being finite and not greater numerically than a small multiple of the focal length of either of the said positive lenses, and two stationary lenses positioned on the optical axis, respectively, optically before and after the said three movable lenses.

9. A variable magnification optical system as claimed in claim 8, in which the stationary lenses are both positive lenses, are of equal focal length and are symmetrically positioned about the mid-position of the three movable lenses.

10. A variable magnification optical system comprising two positive lenses and a negative lens, all arranged on a common optical axis with the two positive lenses spaced apart, and the negative lens between the two positive lenses and spaced from at least one of them, the said lenses all being movable axially and the positive lenses being constrained to maintain a constant axial distance between them during their axial movement, magnification varying means, in combination with said lenses, for continuously and simultaneously moving the two positive lenses and the negative lens along the optical axis relative to a stationary support according to a law such that the distance from a fixed point on the support at which the image of an object at a fixed distance from the said fixed point on the support is accurately focussed remains constant while the size of the said image is continuously varied during the operation of the magnification varying means, the distance between the image position for the rear one of the said positive lenses and the corresponding conjugate object position for the other of the said positive lenses being finite and not greater numerically than a small multiple of the focal length of one of the said positive lenses, and a stationary lens positioned optically in front of the said three movable lenses.

11. A variable magnification optical system as claimed in claim 10, in which the said stationary lens is a negative lens.

12. A variable magnification optical system as claimed in claim 11, in which the said stationary lens is adjustable along the axis to focus the system for objects at various distances from the support.

13. A variable magnification optical system as claimed in claim 12, in which the said stationary lens is of such focal length that when it is focussed for an infinite object distance said stationary lens is positioned to just permit the full range of movement of the movable positive lenses.

References Cited in the file of this patent
UNITED STATES PATENTS

| | | |
|---|---|---|
| 2,165,341 | Capstaff et al. | July 11, 1939 |
| 2,179,850 | Glancy | Nov. 14, 1939 |
| 2,501,219 | Hopkins et al. | Mar. 21, 1950 |
| 2,514,239 | Hopkins | July 4, 1950 |
| 2,537,561 | Waitt | Jan. 9, 1951 |
| 2,566,485 | Cuvillier | Sept. 4, 1951 |
| 2,566,889 | Hopkins | Sept. 4, 1951 |
| 2,578,574 | Miles | Dec. 11, 1951 |
| 2,649,025 | Cook | Aug. 18, 1953 |
| 2,663,223 | Hopkins | Dec. 22, 1953 |